Sept. 6, 1949.　　　　V. E. PALUMBO　　　　2,481,146
COMPACT BEARING WITH AXIALLY
ALIGNED BEARING MEANS
Filed June 12, 1948

INVENTOR.
VINCENT EDWARD PALUMBO
BY
West & Oldham
ATTORNEYS

Patented Sept. 6, 1949

2,481,146

UNITED STATES PATENT OFFICE 2,481,146

COMPACT BEARING WITH AXIALLY ALIGNED BEARING MEANS

Vincent Edward Palumbo, Cleveland Heights, Ohio

Application June 12, 1948, Serial No. 32,622

16 Claims. (Cl. 308—189)

This invention relates to bearings, especially to a compact bearing having axially aligned bearing means therein.

Heretofore there have been many different kinds of bearings provided, some bearings being of general application whereas other bearings have comprised special constructions having specific properties particularly desirable for certain specialized uses. The present invention relates to a relatively specialized bearing wherein the bearing is adapted to facilitate maintenance of a shaft and bearing in a definite given position and where a multiple bearing action is provided in a radially limited space.

The general object of the present invention is to provide an inexpensive, compact, efficient bearing.

A further object of the invention is to distribute the load carried by a bearing onto two portions of the bearing which are not in the same horizontal portion of the bearing, when the bearing is positioned as shown in the drawings.

Another object of the invention is to provide a bearing which is adapted to have relatively even wear.

A further object of the invention is to provide a special multiple bearing which is adapted to use conventional bearing units.

The foregoing and other objects and advantages of the invention will be made apparent as the specification proceeds.

Reference is made to the accompanying drawings, wherein.

Throughout the specification and drawings, corresponding reference numerals will be used to refer to the same parts of the bearing of the invention.

Figure 2:
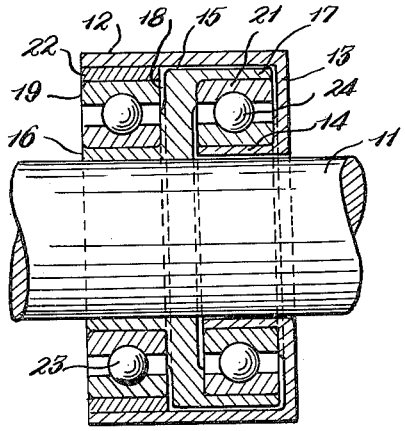
Fig. 2 is a vertical section taken on the line 2—2 of Fig. 1.

Attention should now be had to the details of the structure shown in the drawing and a bearing indicated generally by the numeral 10 is provided, which bearing is in engagement with a shaft 11. The bearing 10 in general comprises a housing or sleeve 12 which is provided with an inwardly turned, or overhanging and inwardly turned, end portion that includes a radially directed end wall 13 having an axially inwardly extending cylindrical portion 14. In order to transmit load forces to opposite sides of the bearing of the invention, an annular member 15, which is substantially Z-shaped in radial section, is provided and is positioned inside of the sleeve 12. The annular member 15 is provided with an inner leg 16, an outer leg 17 and a connecting leg 18 with the legs 16 and 17 being cylindrical and extending parallel to the shaft 11 whereas the connecting leg 18 extends radially of the bearing. Hence the inner and outer legs 16 and 17, respectively, are offset axially of the bearing and the outer leg extends into the overhanging end portion of the sleeve 12, as best shown in Fig. 2. This drawing also shows that the radially outer surface of the outer leg 17 is slightly smaller in diameter than the inner circumference of the sleeve 12. Also, it should be noted that the inner diameter of the cylindrical portion 14 is slightly larger than the outer diameter of the shaft 11 so that the sleeve 12 is out of contact with the shaft whereas the annular member 15 is free from and out of contact with the sleeve 12. Thus bearing means can be provided intermediate the inner and outer legs of the member 15 and the portion of the sleeve 12 spaced therefrom so that a pair of axially aligned bearing members can be formed in the bearing and with opposite portions of the bearing being stressed by load applied thereto.

Fig. 2 shows that conventional bearing rings 19 and 21 are positioned in the bearing 10. The bearing rings 19 and 21 include inner and outer races with conventional ball bearings, or other equivalent members, positioned therebetween. These rings are assembled as a unit in accordance with conventional practice and the ring 19 is positioned between the radially outer surface of the inner leg 16 and the radially inner surface of the sleeve 12. Normally a spacer ring 22 is fixedly secured to the inner surface of the sleeve 12 in the plane of the bearing ring 19 so that the outer bearing race of such ring will be integral with regard to the sleeve 12. Likewise, the inner bearing race of the ring 19 is in fixed association with the inner leg 16 of the member 15. The bearing ring 21 is positioned in a similar manner with the outer bearing race being integral with the outer leg 17, and the inner bearing race being fixedly secured to the radially outer surface of the cylindrical portion 14 of the sleeve 12. The bearing rings 19 and 21 can be secured in these positions by press fits, or any other conventional means.

Normally the bearing 10 will have an outer support positioned tightly therearound and it will be seen that compressive or downward forces exerted by the shaft 11 will be carried through a bearing element 23 down through the bearing ring 19 to the sleeve 12 and its associated support whereas such downward force exerted upon the inner leg 16 of the member 15 will force the outer leg 17 downwardly against the bearing ring 21 and transmit compressive force through a bearing element 24 to the inner and upper surface of the cylindrical portion 14 of the sleeve. Hence more uniform operating and wear conditions will be maintained by the bearing 10 and accurate positioning of the shaft 11 is made possible.

Figure 1:
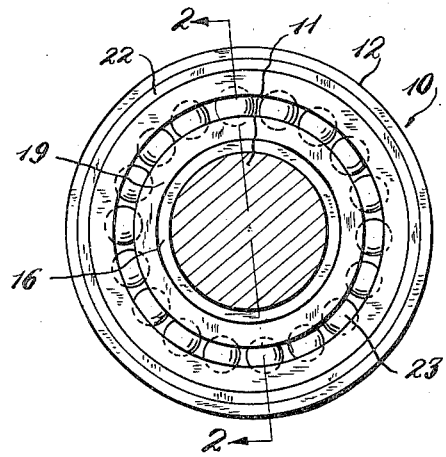
Fig. 1 is an elevation of a bearing embodying the principles of the invention showing it positioned on a shaft.
Figure 3:
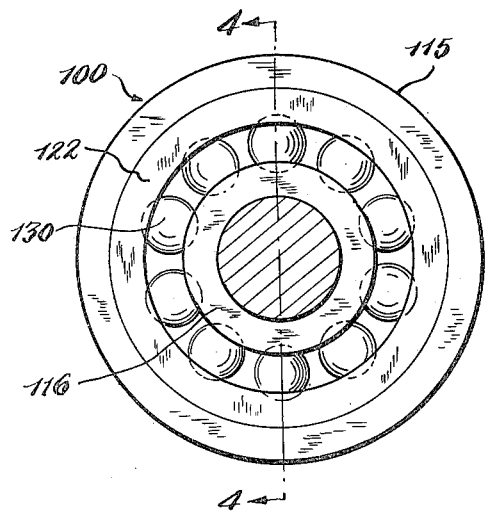
Figs. 3 and 4 are similar views, corresponding to Figs. 1 and 2, of a modification of the invention.
Figure 4:
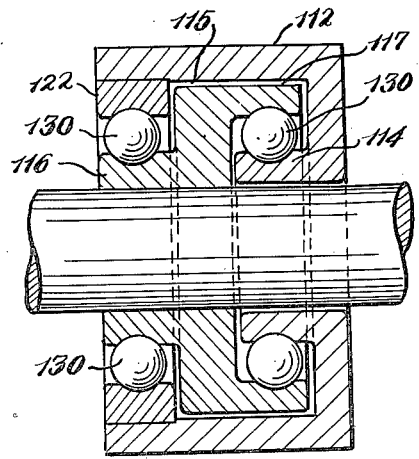

The modification of the bearing of the invention shown in Figs. 3 and 4 includes a bearing generally indicated by the numeral 100. This bearing is of a substantially similar construction to that shown in Figs. 1 and 2 only in this instance an annular member 115, which is provided, and which is of substantially Z-shape in section, actually form part of the bearing rings of the device and conventional bearing rings cannot be used in the structure. This construction eliminates some of the parts of the bearing 10 and permits a smaller diameter bearing to take the same loads as could be carried by a larger bearing of the type shown in Figs. 1 and 2. A sleeve 112 of the same general structure as the sleeve 12, together with a cylinder portion 114 and a spacer 122 are also provided in the bearing 100. Thus bearing elements 130 can be positioned between the spacer ring 122 and an inner leg 116 of the member 115 and between an outer leg 117 and the cylindrical portion 114, as shown.

It will be seen that the special type of a bearing sleeve provided by the invention permits the use of two axially aligned bearing elements in a limited radial space. Furthermore, the constructions of the invention provide for the transmission of forces to diametrically opposed sections of the bearing sleeve since the overhanging, axially inwardly directed section of the bearing sleeve will carry a force at the upper portion of the bearing whereas a straight compressive bearing action will be transmitted downwardly through a bearing element, such as the bearing 19 onto the inner surface of the lower portion of the bearing sleeve 12, of the form of the invention shown in Figs. 1 and 2. "Offset" as used in the specification and claims may be taken to mean that the radially spaced but axially directed portions of the Z-shaped members 15 or 115 are merely positioned in different axial portions of the bearing so that actually these legs of such members may partially overlap axially but are provided with portions that protrude axially from the other leg of the member. Furthermore, it will be realized that these members 15 or 115 may be used as actually part of the bearings containing structure themselves or else they may merely serve as supports for bearing units which may or may not be of conventional construction.

It should be noted that any type of a bearing unit may be used with the bearing of the invention and that such bearing units may be, for example, of the roller, anti-friction or sleeve type.

While several complete embodiments of the invention have been disclosed herein, it will be appreciated that modification of these particular embodiments may be resorted to without departing from the scope of the invention as defined by the appended claims.

Having thus described my invention, what I claim is:

1. A bearing comprising a sleeve member having a radially inwardly turned end section with an axially extending cylindrical inwardly directed portion formed thereon, an annular member of substantially Z-shape in radial section received within said sleeve member and having radially inner and outer legs, the radially inner and outer legs of said annular member being axially offset with the radially outer leg being positioned within the cylindrical portion of the end section of said sleeve member and lying immediately adjacent the radially inner surface of said sleeve member, and bearing means positioned between the radially outer surface of the radially inner leg of said annular member and the radially inner surface of said sleeve member, and between the radially inner surface of the radially outer leg of said annular member and the radially outer surface of the cylindrical portion of the end section of said sleeve member.

2. A bearing as in claim 1 wherein the inner diameter of the end portion of said sleeve is larger than the inner diameter of said annular member and the outer diameter of said annular member is smaller than the inner diameter of said sleeve.

3. A bearing as in claim 1 wherein said annular member forms a part of the bearing means.

4. A bearing as in claim 1 wherein said bearing means comprise two standard bearings positioned in lateral alignment in the bearing of the invention.

5. A bearing comprising a sleeve member having a radially inwardly turned end section with an axially extending cylindrical inwardly directed portion formed thereon, an annular member of substantially Z-shape in radial section received within said sleeve member, said annular member having radially inner and outer leg portions and being axially offset with the radially outer leg portion being positioned within the cylindrical portion of the end section of said sleeve member and lying immediately adjacent the radially inner surface of said sleeve member, a spacer ring positioned within said sleeve member and encompassing the inner leg of said annular member, and ball bearing means positioned between the radially outer surface of the radially inner portion of said annular member and the radially inner surface of said spacer ring, and between the radially inner surface of the radially outer leg of said annular member and the radially outer surface of the cylindrical portion of the end section of said sleeve member.

6. A bearing wherein a bearing sleeve has an overhanging and inwardly turned end portion, a substantially Z-shaped in radial section annular member with the inner and outer legs being offset and with the outer leg extending into the overhanging end of said sleeve, and bearing means positioned between the inner and outer legs of said member and said sleeve to form two axially spaced bearing portions, one bearing means being intermediate the radially outer surface of the inner leg and said sleeve and the other bearing means being between the radially inner surface of said outer leg and the overhanging end of said sleeve.

7. A bearing wherein a bearing sleeve has an overhanging and inwardly turned end portion, a substantially Z-shaped in radial section annular member with the inner and outer legs being axially offset and with the outer leg extending into the overhanging end of said sleeve, and bearing means positioned between the inner and outer legs of said member and said sleeve to form two axially spaced bearing portions that carry load at diametrically opposed areas.

8. A bearing as in claim 7 wherein said annular member has a center leg which extends radially of the bearing and with the inner and outer legs being formed at the ends of the center leg.

9. A bearing as in claim 7 wherein said annular member distributes load onto two diametrically opposed portions of the bearing.

10. A bearing as in claim 7 wherein the inner diameter of the end portion of said sleeve is larger than the inner diameter of said annular member and the outer diameter of said annular member is larger than the inner diameter of said sleeve.

11. A bearing wherein a bearing sleeve has an overhanging and inwardly turned end portion, the inwardly turned section of said end portion being axially directed and being radially spaced appreciably from the inner surface of said sleeve, a substantially Z-shaped in radial section annular member with the inner and outer legs being offset and with the outer leg extending into the overhanging end of said sleeve, and bearing means positioned between the inner and outer legs of said member and said sleeve to form two axially spaced bearing portions, one bearing means being intermediate the radially outer surface of the inner leg and said sleeve and the other bearing means being between the radially inner surface of said outer leg and the overhanging end of said sleeve.

12. A bearing as in claim 7 wherein said annular member is a support member and said bearing means are separate units.

13. A bearing as in claim 7 wherein said annular member directly supports bearing elements of said bearing means.

14. A bearing wherein a bearing sleeve has an overhanging and inwardly turned end portion, the inwardly turned section of said end portion being axially directed and being radially spaced appreciably from the inner surface of said sleeve, a substantially Z-shaped in radial section annular member with the inner and outer legs being axially and radially offset and with the one of the legs extending into the overhanging end of said sleeve, and bearing means positioned between the inner and outer legs of said member and said sleeve to form two axially spaced bearing portions, one bearing means being intermediate the radially outer surface of the inner leg and said sleeve and the other bearing means being between the radially inner surface of said outer leg and another portion of said sleeve.

15. A bearing as in claim 14 wherein a spacer member is associated with said bearing sleeve intermediate same and one leg of said annular member to complete the bearing.

16. A bearing comprising a bearing sleeve having an overhanging and axially inwardly turned end portion substantially parallel to the bore of sleeve, a substantially Z-shaped in radial section annular member having radially inner and outer legs which are axially offset, one leg of said member extending intermediate said sleeve and the overhanging portion thereof and the other leg of said member axially overlapping another portion of said sleeve, and bearing means positioned intermediate the radially inner surface of one leg of said member and one portion of said sleeve and the radially outer portion of the other leg of said member and another portion of said sleeve.

VINCENT EDWARD PALUMBO.

No references cited.